United States Patent [19]

Cavagna

[11] Patent Number: 5,687,630
[45] Date of Patent: Nov. 18, 1997

[54] CART FOR CUTTING UNITS

[75] Inventor: Elio Cavagna, Melegnano, Italy

[73] Assignee: Elio Cavagna S.r.l., Melegnano, Italy

[21] Appl. No.: 544,660

[22] Filed: Oct. 18, 1995

[30] Foreign Application Priority Data

Oct. 25, 1994 [IT] Italy ................. MI940703 U

[51] Int. Cl.[6] ............... B26D 1/14; F16C 29/12; F16C 23/00
[52] U.S. Cl. .............. 83/824; 83/508.2; 83/828; 384/57
[58] Field of Search ................. 83/425.4, 498, 83/499, 614, 508.3, 481, 482, 485, 490, 508.2, 824, 828; 384/50, 53, 57, 58, 59, 39, 40, 41

[56] References Cited

U.S. PATENT DOCUMENTS

| | | | |
|---|---|---|---|
| 532,822 | 1/1895 | Saltzkorn | 83/614 |
| 3,834,258 | 9/1974 | Zumstein | 83/508.3 |
| 3,949,654 | 4/1976 | Stehlin | 83/498 |
| 4,102,227 | 7/1978 | Simko | 83/498 |
| 4,300,271 | 11/1981 | Wohlhaupter | 384/59 |
| 4,836,458 | 6/1989 | Cavagna | 83/508.3 |
| 4,934,234 | 6/1990 | Cavagna | 83/425.4 |
| 5,025,693 | 6/1991 | Tidland et al. | 83/499 |
| 5,458,034 | 10/1995 | Cavagna | 83/508.3 |
| 5,513,916 | 5/1996 | Takei | 384/59 |

*Primary Examiner*—Kenneth E. Peterson
*Assistant Examiner*—Sean A. Pryor
*Attorney, Agent, or Firm*—Bucknam and Archer

[57] ABSTRACT

A cart (10) for cutting units, especially suitable to be applied to apparatuses for shearing paper, comprises a couple of plate-shaped elements (12, 14), approachable to or removable from one another along the longitudinal axis, and connectable by screws (32, 42 ') to one another.

Such plate-shaped elements have a complementary configuration in the respective front portion (18, 34). Couples of screws (42'), which pass through cavities (28) obtained in a plate-shaped element (12), fit in threaded holes (42) obtained on the other plate-shaped element (14), preventing the misalignment of cart (10).

6 Claims, 2 Drawing Sheets

Fig. 1

CART FOR CUTTING UNITS

BACKGROUND OF THE INVENTION

1. Field of the Invention

This invention relates to a cart for cutting units. More particularly, this invention relates to an improved cart for cutting units, comprising a cutter and a counter-cutter, particularly and preferably suitable to be utilized on apparatuses for shearing paper, preferably prepared on rolls or spools.

2. Prior Art

Apparatuses are known which are suitable to cut paper, according to an industrial process of continuous cutting. So, for instance, the U.S. Pat. No. 4,934,234, to Cavagna, granted Jun. 19, 1990, describes apparatuses for cutting paper, provided with a plurality of cutting units, constituted each by a cutter which is caused to match the working table carrying the sheet or strip of paper, beyond which an analogous contrast element is provided. In these apparatuses, each cutter is supported by a cart which, according to the width of the cuts to be performed, is suitably positioned and connected, by means known in themselves, to a beam. The cart is provided, on the front facing said beam, with one or more couples of castors sliding and connectable along grooves obtained on the opposite sides of said beam.

The locking of carts to the beam involves a remarkable drawback that concerns the regulation and connection system of said castor couples, whose supporting shaft fits in a through-cavity of limited extension, obtained in the same cart. The presence of the cavity allows on the one hand to approach to or remove from one another each castor couple for the suitable match with the side walls of the beam, but does not ensure the optimum calibration and constant locking of the cart during its running. The stresses to which the shearing units are submitted may actually give rise to clearances, that, however limited, involve inexactitudes in the cut of the material.

A further drawback is connected to the variable sizing of the beam, whose width is sometimes remarkable; therefore, due to the limited excursion which the through-cavities are allowed, the castors protruding from the cart cannot be removed from one another to a sufficient extent, and the presence of several carts is therefore necessary, depending on the section of the different beams.

SUMMARY OF THE INVENTION

The object of this invention is to obviate the above drawbacks. More particularly, the object of this invention is to provide an improved cart for cutting units, particularly suitable to be applied to apparatuses for shearing paper, suitable to ensure the optimum calibration on the beam of the related cutting units, recovering the clearances which appear during the working. A further object of this invention is to provide an improved cart as defined above, suitable to equip apparatuses whose beam carrying the cutting units shows different sizings. A further object of this invention is to provide an improved cart suitable to ensure a high level of resistance and reliability in the long run, and besides such as to be easily and economically realizable.

These and still objects are achieved improved cart for cutting units, particularly suitable to be utilized on apparatuses for shearing paper, characterized basically in that it comprises a couple of plate-shaped elements or bodies, approachable to or removable from one another along the longitudinal axis and connectable by one or more screws, said elements having a complementary configuration in correspondence of the respective front part.

BRIEF DESCRIPTION OF THE DRAWINGS

The structural and functional characteristics of the improved cart for cutting units subject matter of this invention will be better understood from the following detailed description, wherein reference is made to the figures of the attached drawings which represent a preferred embodiment, presented by way of non limitative example, wherein.

DETAILED DESCRIPTION OF THE PREFERRED EMBODIMENTS

Figure 1:
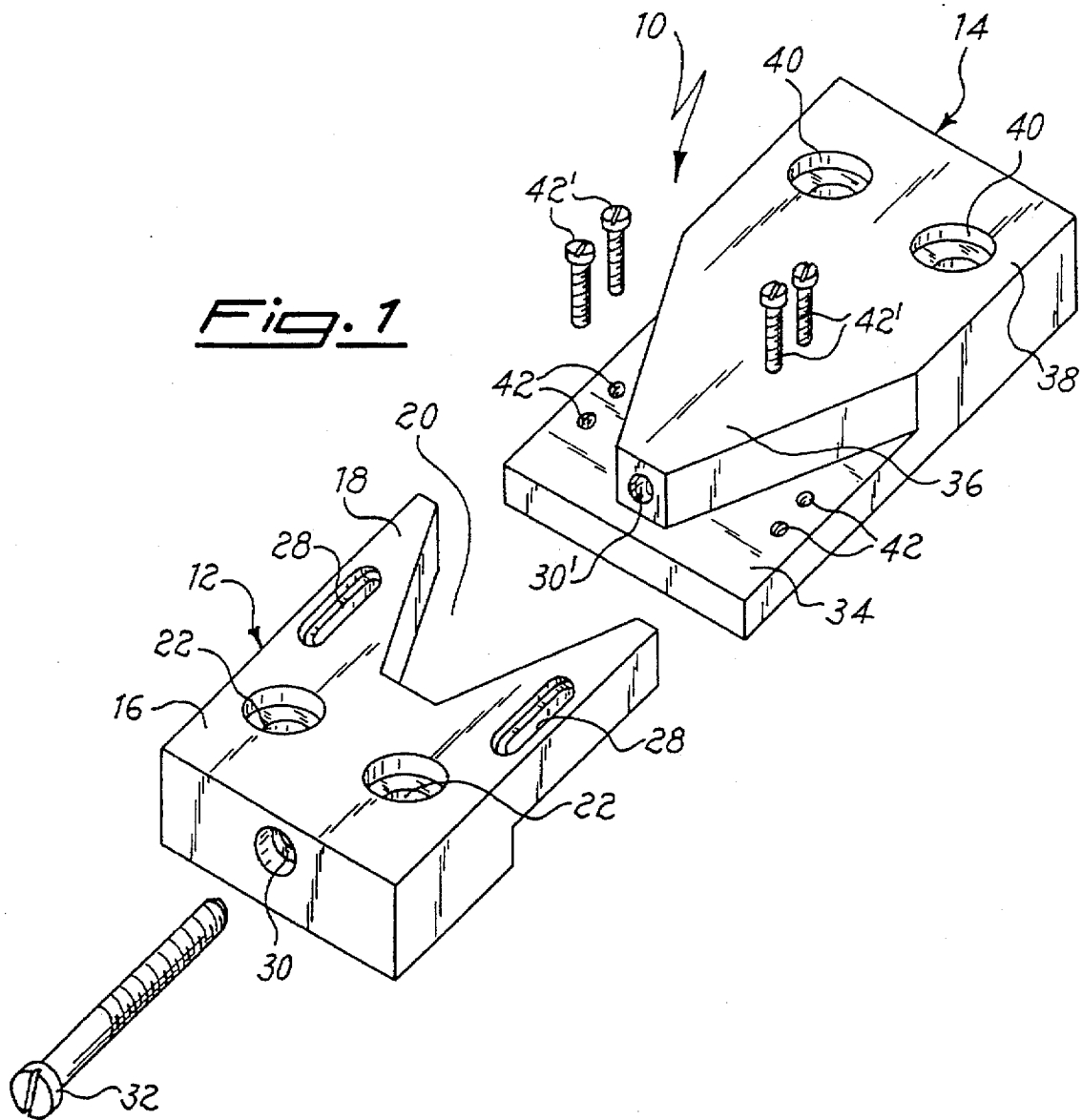
FIG. 1 is the schematic and exploded view of the cart subject matter of this invention.

With starting reference to FIG. 1, the cart for cutting units subject matter of this invention, indicated on the whole by 10, comprises two plate-shaped metal elements or bodies (12, 14), having a prismatic irregular shape, the first plate-shaped element (12) being constituted by a body having two sectors of different height; a first back sector (16), of quadrangular section, higher than the second front sector (18). Said first sector (16) protrudes without solution of continuity in a second front sector (18), substantially dovetail-shaped, cantilevering from the back sector (16), relatively to which it has a markedly shorter height.

The second front sector (18) circumscribes a cavity (20). This latter has, according to a preferred embodiment, a trapezoid regular shape, with the smaller base in correspondence of the back sector of the plate-shaped element or body (12). Said back sector (16) is provided, in a position near the back end, with two coupled through-holes (22), vertically extended, suitable to house shafts (22') supporting the traditional castors (24) which match the beam of the apparatus, indicated by 26 in FIGS. 2 and 4.

Figure 2:
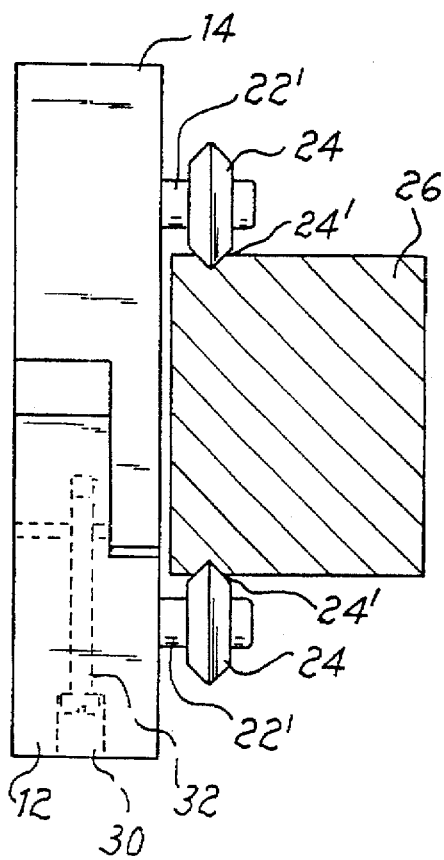
FIG. 2 is the partial schematic side view of a cross section of the cart of FIG. 1, connected to the beam of the apparatus.
Figure 3:
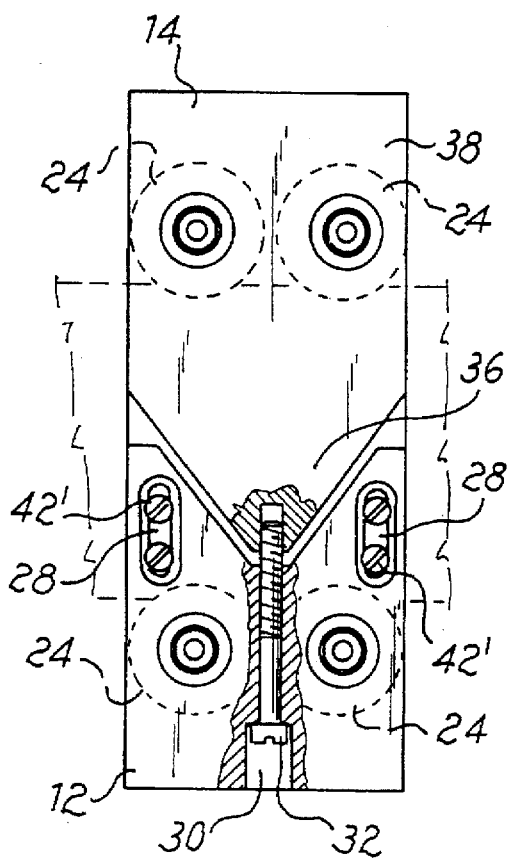
FIG. 3 is the schematic plant view, partly sectioned, of the cart of the preceding figures.

Frontally relatively to said holes (22) and substantially along the two arms of front sector (18) which circumscribe the cavity, the plate-shaped element or body (12) is provided with a couple of shaped through-cavities (28), wherein means for trueing and tying to the second plate-shaped element or body (14) are located, as will be precised in the following. A further through-hole (30), axially developed in the first plate-shaped element or body (12), houses a screw (32) constituting a connection means to the second complementary plate-shaped body (14). Said second plate-shaped body (14) is constituted, in the same way as the preceding one, by two sectors of different height; a first higher sector (38) and a second shorter sector (34). On the second shorter sector (34) an extension (36) develops whose shape is complementary to cavity (20) of the first plate-shaped element (12) and which is aligned with the plane of the first higher sector (38). On the whole, said first sector (38) with extension (36) has the same height as the back sector (16) of the first plate-shaped element (12); while the second shorter sector (34) is so sized as to fit in the lower part of the second front sector (18) of the first plate-shaped element (12), as shown in FIGS. 2, 3 and 4.

On the first sector (38) of the second plate-shaped body (14), two coupled through-holes (40) are obtained, analogous to holes (22) of the first sector (16) of the first plate-shaped element (12), which holes contain shafts (22') which act as supports for castors (24).

Extension (36) has a trapezoid outline, complementary to the one of cavity (20), and is provided on the front with a threaded hole (30') aligned with hole (30) of the first sector (16) of the first plate-shaped element (12). The second shorter front sector (34) of the second plate-shaped element is provided, near each side edge, with at least a couple of threaded holes (42), slightly spaced and aligned to one another. In said threaded holes (42) screws (42') are inserted which go through said shaped cavities (28) and contribute to the connection of said plate-shaped elements (12, 14).

Figure 4:
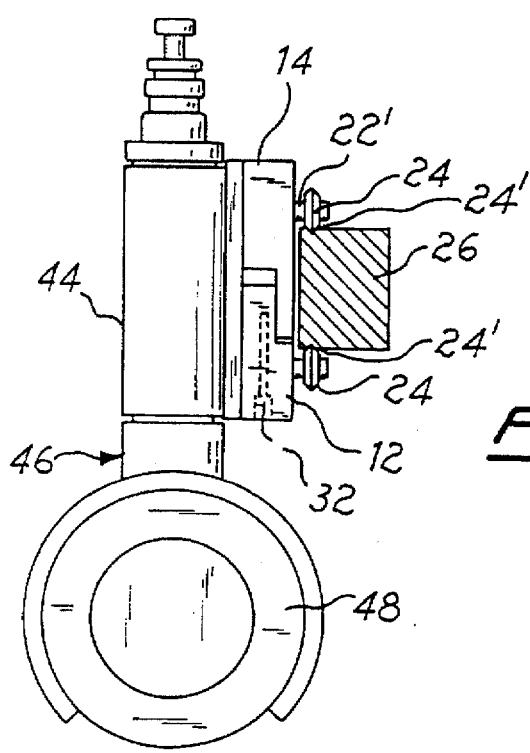
FIG. 4 is the schematic side view, partly sectioned, of the cart connected to the beam of the apparatus, and carrying the cutting unit.

FIG. 4 shows the plate-shaped elements (12, 14) constituting cart (10) subject matter of this invention coupled and tied to one another with means known in themselves to the bearing structure (44) of a cutter (46) provided with a blade (48) and preferably but not critically circular. Said plate-shaped elements (12, 14) are approached to one another in the complementary front portions constituted by extension (36) and cavity (20), and screws (42'), as said, are inserted in the shaped through-cavities (28) of the first plate-shaped body (12). Castors (24) match grooves (24') obtained along the side walls of beam (26). Screw (32), inserted in the through-hole of the first element (12) and screwed in the threaded hole (30') of the second plate-shaped element (14) together with said screws (42'), locks said first and said second plate-shaped elements (12, 14). Said plate-shaped elements are approached to or removed from one another according to the width of said beam (26), thanks to the sliding made possible by the shaped cavities (28), on prior slackening of screws (42').

Once obtained the positioning, screw (32) and the aforementioned screws (42') are screwed and lock stably and constantly said plate-shaped elements (12, 14).

As can be noticed from the above, the advantages achieved by this invention are remarkable.

The improved cart subject matter of this invention may be placed, with an optimum calibration and recovery of clearances, on beam (26) of the cutting apparatus; besides, screws (42') prevent any transversal movement and disalignment of the same.

Obviously, according to the length of through-cavities (28) and screw (32), it is possible to provide for a more or less wide shifting of the first plate-shaped element (12) relatively to the second complementary plate-shaped element (14), to realize a cart (10) which can be easily adapted to beam (26), whatever the size of the latter.

While the cart for cutting unit subject matter of this invention has been described with special reference to the upper blade or cutter (48) of the cutting unit, the same can be utilized to support the counter-cutter of the same unit, and be utilized even on apparatuses fit for shearing materials other than paper. Besides, also structural inversions or alternative locations of the plate-shaped elements that on the whole constitute the cart subject matter of this invention are possible.

Even though this invention has been described above with reference to a preferred embodiment, it is evident that many and various alternatives and variants will be apparent to those skilled in the art, following the description. Therefore, the invention is to be understood as comprising all the alternatives and variations which fall within the spirit and the protection scope of the claims.

I claim:

1. A cart having mounted thereon a cutting unit of an apparatus for shearing paper and adapted for translatory movement on a bearing beam of said apparatus, said cart comprising a) a first plate-shaped element consisting of a higher back sector and a shorter front sector, said shorter front sector being bifurcated to form two segments defining a cavity extending to said higher back sector;

b) a second plate-shaped element consisting of a higher back sector and a shorter front sector, said shorter front sector having on a surface an extension with a shape complementary to the cavity in said front sector of said first plate-shaped element, said extension being aligned with a plane defined by the back sector of said second plate-shaped element, said back sector with extension of said second plate-shaped element having a height equal to that of the back sector of said first plate-shaped element, and the front sector of said second plate-shaped element being sized to fit in a lower part of the shorter front sector of said first plate-shaped element;

c) means for adjustably connecting said first and second plate-shaped elements together so that the shorter front sector of said first plate-shaped element and the shorter front sector of said second plate-shaped element are contiguous and the extension on the surface of the shorter front sector of the second plate-shaped element extends into the cavity defined by the two segments of the shorter front sector of the first plate-shaped element and adjustable movement along a longitudinal axis defined by said extension and said cavity is permitted; and d) means for trueing and fixing together said first and second plate-shaped elements.

2. The cart as defined in claim 1, wherein the shorter front sector of said first plate-shaped element is dovetail shaped and said cavity has the shape of a trapezoid with a smaller base thereof at the higher back sector of said first plate-shaped element.

3. The cart as defined in claim 1, which further includes at least one elongated opening formed in the front sector of said first plate-shaped element parallel to said longitudinal axis, and a through bore therein aligned with said longitudinal axis.

4. The cart as defined in claim 3, which further includes at least two spaced apart screw holes in the front sector of said second plate-shaped element aligned with said at least one elongated opening, and securing screw means passing through said at least one elongated opening to engage said screw holes and secure said first plate-shaped element so as to true and fix together said first and second plate-shaped elements.

5. The cart as defined in claim 3, which further includes a threaded bore in said second plate-shaped element aligned with the through bore in said first plate-shaped element, and screw means passing through said through bore in said first plate-shaped element to engage the threaded bore in said second plate-shaped element and secure said first plate-shaped element so as to fixedly adjust said first plate-shaped element with respect to said second plate-shaped element.

6. The cart as defined in claim 1, which further includes through bores in the higher back sectors of said first and second plate-shaped elements for axle shafts of castors for mounting said cart on said bearing beam.

* * * * *